Patented July 4, 1939

2,164,804

UNITED STATES PATENT OFFICE 2,164,804

PROCESS FOR THE MANUFACTURE OF THROMBIN

Hanns Dyckerhoff, Munich, Germany

No Drawing. Application November 24, 1937, Serial No. 176,395. In Germany December 5, 1936

8 Claims. (Cl. 195—66)

My invention relates to a process for the manufacture of thrombin.

It is an object of my invention to raise the yield of thrombin obtainable from animal fibrin. It is another object of my invention to obtain thrombin preparations of high quality, being very effective and having a high coagulating power. Still another object of my invention is the preparation of an extraction medium having a hydrogen ion concentration exceeding the pH value of 6 and the use of such a medium for extracting thrombin from animal fibrin. Other objects and advantages shall appear from the following detailed description.

The usual method of manufacturing thrombin is first to make a solution of thrombin from animal fibrin, for example pig fibrin, cow or ox fibrin or the like, which solution forms the starting material for the manufacture of the thrombin. The crude thrombin is then precipitated from this solution with the aid of an organic solvent, which is miscible with water or a mixture of such solvents may be employed. Acetone is preferably employed as the precipitating agent. The thrombin can then be subjected to further purification by extraction with water and repeated precipitation by treatment with an organic solvent, both treatments being, if necessary, repeated several times. The thrombin obtained is finally carefully dried. However, even if all precautions are taken such as working at a low temperature, careful drying, and removal of the adhering water with a volatile organic solvent which is then driven off, it has not hitherto been possible to obtain uniform and satisfactory yields by means of this process, so that the process was of no practical importance in industry.

Now I have found that the yields of thrombin are largely dependent on the hydrogen ion concentration of the extraction medium which is formed during the extraction of the first acetone precipitate, i. e. the crude thrombin, by means of water. This hydrogen ion concentration varies and is affected to a greater or less extent by the degradation products of the albuminous materials which tend to lower the pH value, so that if water, having a pH value of about 7, is employed as a neutral extraction agent an extraction medium of which the pH value lies considerably below the neutral point is always obtained.

My experiments have also shown that the yields of thrombin rapidly increase if care be taken that the hydrogen ion concentration of the extraction medium is such that the pH value exceeds 6.

From a pH of 6.3 upwards the yields of thrombin begin to increase considerably. Also pH values which are already within the alkalinity range, for example pH 8 and above this, give effective thrombin preparations with higher yields. Very favorable conditions are obtained if the pH value of the extraction medium is adjusted so that it lies between about 6.5 and 7.5 that is to say in the neighborhood of the neutral point. In addition to high yields I obtain also products of a particularly high quality.

According to my invention, therefore, extraction of the acetone precipitate, i. e. the crude thrombin, is effected with water in the presence of a substance which increases the pH value, for example with water which has been made alkaline or contains an alkali or alkaline earth. The extraction is carried out at ordinary temperatures or at least at such temperatures not exceeding 25° C. In this manner I obtain high yields of thrombin and the thrombin preparations obtained are also very effective.

I have further found that the yield of thrombin can be considerably increased by employing fresh dried fibrin as the starting material and preparing from it the starting solutions to be precipitated. The fresh fibrin is dried at as low a temperature as possible, and the drying may advantageously be carried out in the following manner. I treat fresh fibrin such as is obtained for example in slaughter-houses, after it has been freed as far as possible from the adhering blood pigment by washing with water, with an organic solvent, for example with acetone or acetone and ether, whereby the drying of the fibrin at a low temperature is facilitated.

Example 1

200 grams of fresh pig fibrin are well washed with water and after being pressed are broken up in a mincing machine. The fibrin pulp thereby obtained is treated with 600 cc. of water and 74 grams of common salt, so that the content of common salt, taking into account the water content of the fibrin, amounts to 10%. The material is allowed to remain e. g. for four days at room temperature or until a test sample taken from the extract shows that there is no longer any increase in thrombin. The material is then filtered and the 700 cc. of extract obtained are treated with as much acetone as does not cause salt to be precipitated. The precipitate obtained is centrifuged and again absorbed in 700 cc. of water to which so much N/100 caustic soda solution has been added that a pH value of 7.2 is obtained. The undissolved portion is centrifuged off and acetone is then added in a proportion of about 1:1 to the clear solution obtained. The precipitate is then again centrifuged, the residue is washed with acetone and then with ether and is then separated by centrifuging from the washing liquid. The residue which is moist with ether is then dried in air. A yield of 0.9 gram of thrombin having a coagulation factor corresponding to 1 mg.=2 mins. 50 secs. is obtained.

*Example 2*

50 grams of dry fibrin which are obtained by drying fresh washed pig fibrin with acetone and then with ether are extracted at room temperature with 250 cc. of a 10% sodium chloride solution. The duration of the extraction amounts to about seven days. A longer extraction shows no increase in effectiveness if a test sample be taken. The liquid is then centrifuged from the solid constituents and the 250 cc. of extract obtained are treated with about 250 cc. of acetone. The precipitate which is separated from the solution by centrifuging is absorbed in 250 cc. of a N/100 caustic soda solution, whereby an extraction medium having a pH value of 7.47 is obtained. The liquid is then centrifuged from the undissolved portion and is treated with acetone in a proportion of about 1:1. After the precipitate has been separated by centrifuging it is washed with acetone and then with ether and, after the washing liquid has been removed by centrifuging, the precipitate is dried in air, 250 grams of thrombin having a coagulation factor corresponding to 1 mg.=3 mins. 45 secs. is obtained.

It will be understood that various changes may be made in the detailed examples above given, without departing from the spirit of the present invention.

While I have spoken in the foregoing specification of solvents, it is clear for those skilled in the art that the solvents mentioned in the specification act in my process only as precipitants and do not dissolve the thrombin.

Having now particularly described and ascertained the nature of my said invention and in what manner the same is to be performed, I declare that what I claim is:

1. A process for the manufacture of thrombin comprising washing fresh fibrin with water, breaking up the fibrin and treating the fibrin pulp obtained with an aqueous solution of common salt, allowing the material to remain for several days at room temperature, filtering the material and treating the filtrate with acetone, absorbing the precipitate again with water in the presence of an inorganic alkaline substance which brings the pH value of the extraction medium to between 6.5 and 7.5, and adding acetone to the clear solution, washing the precipitate with acetone and ether, separating it from the washing liquid and drying the residue in air.

2. A process for the manufacture of thrombin from a solution of animal fibrin comprising drying fresh washed fibrin with acetone and ether, extracting the material with a 10% sodium chloride solution for several days, separating the extract from the solid constitutents and treating the extract with acetone, separating the precipitate from the solution and absorbing the precipitate in a N/100 caustic soda solution, separating the liquid from any undissolved portions and treating the liquid with acetone, washing the precipitate obtained with acetone and ether and drying the precipitate in air.

3. In a process for the manufacture of thrombin from a solution of animal fibrin, the steps of extracting crude precipitated thrombin with water in the presence of an inorganic alkaline substance which increases the pH of the extraction medium but not substantially in excess of a value of about 8, reprecipitating the thrombin, and then drying the thrombin obtained.

4. In a process for the manufacture of thrombin from a solution of animal fibrin, the steps of extracting crude precipitated thrombin with water in the presence of an inorganic alkaline substance which brings the pH value of the extraction medium to between 6.5 and 7.5, reprecipitating the thrombin, and then drying the thrombin obtained.

5. A process for the manufacture of thrombin comprising preparing a solution of dry fresh fibrin, precipitating the thrombin from this solution by the addition of a water-miscible organic solvent, extracting the precipitate with water in the presence of an inorganic alkaline substance which increases the pH value of the extraction medium but not substantially in excess of a value of about 8, repeating the precipitation, and then drying the thrombin obtained.

6. A process for the manufacture of thrombin comprising preparing a solution of dry fresh fibrin, precipitating the thrombin from this solution by the addition of a water-miscible organic solvent, extracting the precipitate with water in the presence of an inorganic alkaline substance which brings the pH value of the extraction medium to between 6.5 and 7.5, repeating the precipitation, and then drying the thrombin obtained.

7. A process for the manufacture of thrombin comprising drying fresh fibrin by eliminating water therefrom by entrainment with a volatile water-miscible solvent, dissolving said dried fibrin, precipitating the thrombin from this solution by the addition of a water-miscible organic solvent, extracting the precipitate with water in the presence of an inorganic alkaline substance which increases the pH value of the extraction medium but not substantially in excess of a value of about 8, repeating the precipitation, and then drying the thrombin obtained.

8. A process for the manufacture of thrombin comprising drying fresh fibrin by eliminating water therefrom by entrainment with acetone, dissolving said dried fibrin, precipitating the thrombin from this solution by the addition of a water-miscible organic solvent, extracting the precipitate with water in the presence of an inorganic alkaline substance which increases the pH value of the extraction medium but not substantially in excess of a value of about 8, repeating the precipitation, and then drying the thrombin obtained.

HANNS DYCKERHOFF.